US009284176B2

(12) United States Patent
Tuyls et al.

(10) Patent No.: US 9,284,176 B2
(45) Date of Patent: Mar. 15, 2016

(54) BEVERAGE DISPENSING APPARATUS WITH A REFRIGERATED DISPENSING TUBE BUNDLE AND ADJUSTABLE BYPASS MANIFOLD

(75) Inventors: Jim Tuyls, Vacaville, CA (US); Thomas Hecht, Winters, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 0 days.

(21) Appl. No.: 13/298,132

(22) Filed: Nov. 16, 2011

(65) Prior Publication Data

US 2013/0119089 A1 May 16, 2013

(51) Int. Cl.

| | |
|---|---|
| ***B67D 7/80*** | (2010.01) |
| ***G01F 11/28*** | (2006.01) |
| ***F25D 3/00*** | (2006.01) |
| ***B67D 1/00*** | (2006.01) |
| ***B67D 1/08*** | (2006.01) |
| ***F28D 7/00*** | (2006.01) |

(52) U.S. Cl.
CPC ............ *B67D 1/0084* (2013.01); *B67D 1/0867* (2013.01); *F28D 7/0008* (2013.01)

(58) Field of Classification Search
CPC ... B67D 1/0084; B67D 1/0867; F28D 7/0008
USPC ......... 222/144.5, 146.1, 146.6, 424; 251/205, 251/208, 209, 264, 298, 301, 304; 165/103; 137/339; 62/389, 396
See application file for complete search history.

(56) References Cited

U.S. PATENT DOCUMENTS

| | | | | |
|---|---|---|---|---|
| 4,518,104 | A * | 5/1985 | Iannelli et al. | 222/146.6 |
| 5,123,628 | A * | 6/1992 | Yu | 251/209 |
| 5,791,888 | A * | 8/1998 | Smith | 418/149 |
| 6,341,500 | B1 * | 1/2002 | Paxman | 62/389 |
| 2009/0283543 | A1 * | 11/2009 | Schroeder et al. | 222/144.5 |
| 2011/0042415 | A1 | 2/2011 | Santy et al. | |

* cited by examiner

*Primary Examiner* — Frederick C Nicolas
*Assistant Examiner* — Matthew Lembo
(74) *Attorney, Agent, or Firm* — Kilpatrick Townsend & Stockton LLP

(57) ABSTRACT

Beverage dispensing apparatus, systems, and related methods are provided that have a recirculation loop to cool fluids in a dispensing tube bundle that delivers beverage fluids to a beverage dispensing assembly. A beverage dispensing apparatus includes an adjustable bypass manifold having an adjustable flow restriction that is configurable to enable the use of the beverage dispensing apparatus with different chilled soda recirculation systems. The adjustable bypass manifold includes ports for connection to the recirculation loop and ports for connection to a soda recirculation system.

19 Claims, 14 Drawing Sheets

BEVERAGE DISPENSING APPARATUS WITH A REFRIGERATED DISPENSING TUBE BUNDLE AND ADJUSTABLE BYPASS MANIFOLD

BACKGROUND

The present invention relates generally to the field of beverage dispensers, and more particularly to beverage dispensers having a recirculation loop that cools a dispensing tube bundle and an adjustable bypass manifold that enables the use of the beverage dispensers with different chilled soda recirculation systems.

Many beverage dispensers use tubing to transfer a beverage fluid from a source container to a dispensing assembly, such as a bar gun or a beverage dispensing tower. While the beverage fluid in the source container can be kept suitably cool, for example, via refrigeration, if the tubing used to transfer the beverage fluid is exposed to ambient temperatures, the temperature of the beverage fluid in the tubing may increase undesirably, especially where the beverage fluid dwells in the tubing for any significant amount of time. To prevent such warming of the beverage fluid, recirculation loops have been used to re-circulate the beverage fluid through a cooling unit, thereby maintaining a ready supply of suitably cool beverage fluid for dispensing.

For example, refrigerated re-circulating pump carbonators have been used to re-circulate carbonated water (also known as soda) from the refrigerated carbonator to a dispenser (e.g., soda gun, dispensing tower) and back to the carbonator, often through an insulated, multi-tube conduit. Two tubes inside the multi-tube conduit are dedicated to the re-circulating chilled soda. In this way, one or more dispensers can always tap into a consistently chilled supply of soda (typically between 33 and 36 degrees F.).

Referring to FIG. 1, many existing recirculation systems use a special fitting often referred to as a U-bend fitting 10 (also known as a return-bend fitting). The U-bend fitting 10 is typically made from three-eighths inch inside diameter stainless steel tube bent in the shape of a "U". Both ends of the U-shaped tube have "barbs" machined into the first one-half inch of the tube to allow the soda incoming tubing and the soda return tubing to be reliably secured to the U-bend fitting. A secure connection is especially important in recirculation systems using a "Vane" pump, which in many existing systems generates flow rates of between 50 to 100 gallons per hour (gph) at operating pressures of between 75 to 100 pounds per square inch (psi). The U-bend fitting 10 typically has an outlet 12 welded into the outside/bottom surface of the U. The outlet 12 outputs soda from the recirculation loop to a soda inlet fitting 14 coupled to a dispensing valve and manifold assembly 16 via a short piece of tubing 18. The soda is then transferred to a dispenser (e.g., bar gun 20) through a dispensing tube bundle 22. Often, the U-bend fitting 10 and the short piece of tubing 18 are insulated to minimize loss of chill and to prevent condensation build-up and associated leakage.

A refrigerated re-circulating pump carbonator can provide a sufficient amount of chilled soda for multiple dispensers. Such multi-dispenser re-circulation loops are configured so that the soda supplying recirculation loop does not dead end at a dispenser. A series of U-bend fittings, one for each soda gun in the system, is used. The last U-bend fitting(s) in the system then sends the soda back to the carbonator to be re-chilled and pumped back through the system, continuously.

There are two types of refrigerated re-circulating pump carbonators that are prevalent in Europe and the United Kingdom. The first is a small, relatively in-expensive miniature refrigerated carbonator that used a "magnetic" drive pump. These "Mag Pump" carbonators are designed to provide chilled soda to one soda gun located within a maximum of 45 feet of the carbonator. This inexpensive, efficient, and compact mini carbonator is well suited for use in thousands of small pubs and cafe's in Europe and in the United Kingdom. The second is a larger system suitable for use with multiple dispensers. Larger, multi-dispenser recirculation systems can have tubing lengths, between carbonator and dispensers, of between 50 and 250 feet. These larger multi-dispenser systems require refrigerated recirculation carbonators with larger refrigeration systems and more powerful soda recirculation pumps. These larger carbonators commonly use Carbon Vane pumps referred to as "Vane" Pumps. Compared to the Mag Pump systems, which re-circulate soda at a rate of 15 gallons per hour (gph) and operate at pressures between 50 and 75 pounds per square inch (psi), the larger systems with "Vane Pumps" recirculate soda at a rate of 50 to 100 gph at operating pressures between 75 psi and 110 psi.

Refrigerated re-circulating soft drink systems, however, are somewhat complicated and expensive. They require well-trained installers and service technicians, preferably with refrigeration experience. Combined with the fact that refrigerated re-circulating carbonators typically run day and night, seven days a week, the cost in electricity can be considerable. In addition, pumps and pump-motors are common wear parts that are expensive to replace.

In view of the complexity and expense of refrigerated re-circulating soft drink systems, cold plate systems provide a less expensive alternative. A cold plate system includes a cold plate typically formed from stainless steel tubing cast inside a block of aluminum alloy. In earlier systems, the cold plate was typically placed in the bottom of a bartender's "Ice Bin" and then kept covered with ice. The ice chills the aluminum and transfers that chill into soda and beverage flavor syrups flowing through the stainless steel tubes inside the cold plate. An "ambient" carbonator is located in the vicinity, typically within 10 to 20 feet of the cold plate. The ambient carbonator is not refrigerated—it carbonates water at the ambient temperature of the water available in the bar or restaurant. The carbonated water in a cold plate soda system is not chilled until it reaches the cold plate. Therefore, the tubing does not need to be insulated until after it leaves the cold plate—leaving about three to four feet of insulated tubing from the cold plate to the dispenser's manifold.

Cold plate systems typically cost less than half what a refrigerated re-circulation system costs. Cold plate systems are simple to install and the installer and service technicians do not need to have refrigeration experience. The cold plate system's ambient carbonator only runs when the carbonated water is used. The carbonator pump/motor will run for approximately 10 to 12 seconds to refill the carbonator with water when soda is dispensed from the system. Otherwise, it is off, thereby conserving electricity. Ice, however, does cost money. Depending on volume, a cold plate system can consume a considerable amount of ice.

Cold plate systems have evolved over time. Loose cold plates lying in the bottoms of ice bins containing potable ice started to be outlawed in numerous states in the mid to late 60's. Eventually, all state health departments outlawed loose cold plates. In response, ice bin manufacturers started building the cold plate right into the bottom surface of the ice bin. This became known as a "sealed-in cold plate" ice bin. Once sealed in cold plate ice bins became plentiful, ubiquitous, and inexpensive, refrigerated recirculation soda systems have become less common in the USA.

Cold plate systems, like refrigerated recirculation systems, have been used in soda recirculation loops. In the configuration illustrated in FIG. 1, the soda recirculation loop is located upstream of the dispensing valve and manifold assembly 16. Although the amount of fluids contained in the typically one-eighth inch inside diameter (ID) soda and beverage concentrate tubing used in the dispensing tube bundle 22 is relatively small, recirculation loops that extend downstream of the dispensing valve and manifold assembly 16 were developed in response to market demand.

Referring to FIG. 2, in the mid 1990s, Automatic Bar Controls, Inc. developed a simple but somewhat clever method for maintaining a supply of chilled soda at a soda dispensing bar gun 24. This system was called a Soda Diverter Valve Dispenser (SDV) system. Chilled soda, for example from a cold plate outlet, was routed (via a tee branch fitting 26) through a first dedicated tube in a dispensing tube bundle 28 from a dispensing valve and manifold assembly 30 up to the bar gun 24 and then back to the valve and manifold assembly 30 through a second dedicated tube in the dispensing tube bundle 28. A recirculation loop in the bar gun 24 receives the chilled soda from the first dedicated tube and discharges the chilled soda to the second dedicated tube, which returns the chilled soda back to the valve and manifold assembly 30.

In one version of the SDV system, the return soda tube exited the valve and manifold assembly 30 and then flowed into a "normally closed" solenoid 32 to a sanitary drain. An electronic timer opened the solenoid 32 every seven minutes for 15 seconds to allow the chilled soda to flow through the recirculation loop in the bar gun 24, thus cooling adjacent fluids in both the bar gun 24 and in the dispensing tube bundle 28. Although the SDV dispenser concept was shown to many American beverage companies, none were interested. Automatic Bar Control's distributors overseas did embrace the SDV concept and began buying SDV dispensers in the late 1990s. This Distributor has been re-selling the SDV soda guns to beverage companies in Europe and those companies have been re-circulating chilled soda from small European-made refrigerated carbonators.

Automatic Bar Controls, Inc. has developed two types of recirculation handles. In the mid 1990s, the "Machined Recirc Handle" was developed by machining a loop "track" into one of the layers (plates) of acrylic that made up the machined handle. The five layers (plates) of the handle were individually machined and then bonded together. FIG. 3A shows a plan view of the Machined Recirc Handle 34 that illustrates the recirculation loop 36. FIG. 3B shows a rear view of the Machined Recirc Handle 34 that illustrates an inlet 38 and an outlet 40 for the re-circulating soda. And in the late 1990s, Automatic Bar Controls, Inc. started the development of a molded handle 42, which is illustrated in FIGS. 4A, 4B, and 4C. In response to the growing demand for recirculation bar guns, a passageway (recirculation loop 44) was designed into the rear portion of the bottom molded layer (plate) of the molded handle 42. A heel adapter 46 for the molded handle has "knockout" inlet/outlet tubing ports 48, 50 that are normally closed. If the handle was to be configured to make a "recirc" soda gun, the inlet/outlet tubing ports 48, 50 were drilled out allowing access to the recirculation loop 44 molded into the rear of the bottom plate.

While significant developments in beverage dispensing systems with recirculation loops have occurred, further developments remain desirable. For example, more easily implemented beverage dispensing systems that maintain chilled beverage temperatures downstream of a dispensing valve and manifold assembly are desirable.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

More easily implemented beverage dispensing systems, and related methods, are provided that maintain chilled beverage temperatures downstream of a dispensing valve and manifold assembly. An adjustable bypass manifold is used to selectively control bypass flow characteristics consistent with the type of recirculation system employed upstream of the dispensing valve and manifold assembly. In many embodiments, the adjustable bypass manifold is configurable to a selected one of two settings, each of the two settings being suitable for a prevalent existing refrigerated re-circulating carbonation system, such as "Vane" and "Mag" systems. And in many embodiments, the flow rate of a cooling fluid, for example chilled soda, re-circulated downstream of the dispensing valve and manifold is suitably controlled to provide sufficient levels of cooling while avoiding excessive cooling that may result in the formation of significant condensation.

Thus, in one aspect, a beverage dispensing apparatus is provided. The beverage dispensing apparatus includes a dispensing assembly, a beverage supply line, an adjustable bypass manifold, and a recirculation loop. The dispensing assembly (e.g., a bar gun, a soda gun) is configured to dispense a beverage fluid. The beverage supply line is configured to supply the beverage fluid to the dispensing assembly. The adjustable bypass manifold includes a cooling fluid supply inlet configured to receive a first flow of a cooling fluid, a cooling fluid supply duct in fluid communication with the cooling fluid supply inlet, a recirculation loop supply outlet in fluid communication with the cooling supply duct, a recirculation loop return inlet, a cooling fluid return duct in fluid communication with the recirculation loop return inlet, a cooling fluid return outlet in fluid communication with the cooling fluid return duct, and a flow restriction between the cooling fluid supply duct and the cooling fluid return duct. The cooling fluid return outlet is configured to output at least a portion of the first flow of the cooling fluid. The cooling fluid return duct is in fluid communication with the cooling fluid supply duct through the flow restriction. The flow restriction is adjustable to control a rate of flow of the cooling fluid through the flow restriction. The recirculation loop is in fluid communication with the recirculation loop supply outlet and the recirculation loop return inlet. In many embodiments, the recirculation loop is configured to absorb heat so as to cool the beverage fluid in the beverage fluid supply line. And the dispensing assembly can be configured to selectively dispense a portion of the cooling fluid directly from the recirculation loop.

In many embodiments, the beverage dispensing apparatus is configured to selectively dispense one or more of multiple beverage fluids. For example, the beverage dispensing apparatus can further include one or more additional beverage supply lines to supply one or more beverage fluids to the dispensing assembly. The recirculation loop can be configured to absorb heat so as to cool the one or more beverage fluids in the beverage supply lines. And the beverage dispensing apparatus can include a valve assembly that includes a plurality of valves to selectively control the flow of the beverage fluids to the dispensing assembly. The recirculation loop can be in fluid communication with the adjustable bypass manifold through the valve assembly. The valve assembly can be configured to control a rate of flow of the cooling fluid through the recirculation loop. For example, the flow rate of the cooling fluid through the recirculation loop can be controlled to inhibit the formation of condensation. The flow rate of the cooling fluid through the recirculation loop can be controlled to be approximately 5 ml per second. The valve assembly can include a dynamic flow regulator to maintain a substantially constant flow rate of the cooling fluid through the recirculation loop.

The recirculation loop can be configured to maintain suitably low temperatures of the beverage fluid(s) in the beverage supply line(s). For example, the recirculation loop can extend so that a portion of the recirculation loop is disposed within the dispensing assembly. Alternatively, the recirculation loop can terminate upstream of the dispensing assembly, for example, just upstream from the dispensing assembly.

In many embodiments, the flow restriction is adjustable between an open position and a closed position. The open position minimizes the flow restriction provided by the adjustable flow restriction. And the closed position maximizes the flow restriction provided by the adjustable flow restriction while still providing a non-zero rate of flow through the adjustable flow restriction. In many embodiments, the adjustable flow restriction includes an orifice, and the cooling fluid return duct is in fluid communication with the cooling fluid supply duct through the orifice when the adjustable flow restriction is in the closed position. The adjustable bypass manifold can be configured to accommodate the first flow of cooling fluid received by the cooling supply inlet of between 50 gallons per hour (gph) and 100 gph at a supply pressure of 75 pounds per square inch (psi) to 110 psi when the adjustable flow restriction is in the open position and to accommodate the first flow of cooling fluid received by the cooling supply inlet of 15 gph at a supply pressure of 80 psi to 100 psi when the adjustable flow restriction is in the closed position. In many embodiments, the flow restriction is continuously adjustable between the open and closed positions to provide a corresponding continuous variation in the amount of flow restriction provided.

In many embodiments, the adjustable bypass manifold further includes a cooling supply outlet to output at least a portion of the first flow of the cooling fluid to a supply line that transfers the portion to the dispensing assembly for dispensing from the dispensing assembly, and the cooling fluid is a beverage fluid (e.g., chilled soda, chilled water). The cooling supply outlet can be integrated into the adjustable bypass manifold in any suitable way. For example, the cooling supply outlet can be integrated into the adjustable bypass manifold so that the cooling supply outlet is in fluid communication with the cooling fluid supply duct and is in fluid communication with the cooling fluid return duct through the adjustable flow restriction. As another example, the cooling supply outlet can be integrated into the adjustable bypass manifold so that the cooling supply outlet is in fluid communication with the cooling fluid return duct and is in fluid communication with the cooling fluid supply duct through the adjustable flow restriction. In many embodiments, the cooling fluid is selected from the group consisting of water and carbonated water.

In another aspect, a beverage dispensing system is provided. The beverage dispensing system includes a plurality of the above-described beverage dispensing apparatus. Each of the adjustable bypass manifolds is in fluid communication with a recirculation line carrying the cooling fluid and circulating the cooling fluid through a cooler.

In another aspect, a method is provided for cooling beverage fluids in supply lines conveying the beverage fluids to a dispensing assembly. The method includes receiving a first flow rate of a cooling fluid from a cooling fluid source; dividing the first flow rate of the cooling fluid into a second flow rate and a third flow rate by using an adjustable flow restriction to control the third flow rate, the third flow rate being greater than zero; circulating the second flow rate of the cooling fluid through a recirculation loop; and returning at least a portion of the third flow rate to the cooling fluid source without circulating the third flow rate through the recirculation loop. When the cooling fluid is a beverage fluid, the method can further include dispensing a portion of the first flow rate of the cooling fluid from the dispensing assembly. In many embodiments, the method further includes absorbing heat into the cooling fluid in the recirculation loop to cool the beverage fluids in the supply lines.

In another aspect, an adjustable bypass manifold is provided for use in a beverage dispensing apparatus. The adjustable bypass manifold includes a main body and a restriction member engaged with the main body. The main body includes a cooling fluid supply inlet, a cooling fluid supply duct, a recirculation loop supply outlet, a recirculation loop return inlet, a cooling fluid return duct, and a cooling fluid return outlet. The cooling fluid supply inlet is configured to receive a first flow of a cooling fluid. The cooling fluid supply duct is in fluid communication with the cooling fluid supply inlet. The recirculation loop supply outlet is in fluid communication with the cooling fluid supply duct. The cooling fluid return duct is in fluid communication with the recirculation loop return inlet. And the cooling fluid return outlet is in fluid communication with the cooling fluid return duct. The cooling fluid return outlet is configured to output at least a portion of the first flow of the cooling fluid. The restriction member provides a flow restriction between the cooling fluid supply duct and the cooling fluid return duct. The cooling fluid return duct is in fluid communication with the cooling fluid supply duct through the flow restriction. The restriction member is adjustable to control a flow rate of the cooling fluid through the flow restriction between a maximum flow rate when the restriction member is in an open position and a minimum non-zero flow rate when the restriction member is in a closed position.

In many embodiments, the restriction member includes an orifice. And the cooling fluid return duct is in fluid communication with the cooling fluid supply duct through the orifice when the restriction member is in the closed position.

In many embodiments, the restriction member is mounted for rotation relative to the body. The rotating restriction member can include an orifice. And the cooling fluid return duct can be in fluid communication with the cooling fluid supply duct through the orifice when the restriction member is in the closed position. The adjustable bypass manifold can further include a locking mechanism to selectively inhibit relative rotation between the restriction member and the main body. In many embodiments, the position of the restriction member relative to the main body is continuously adjustable between the open and closed positions to provide a corresponding continuous variation in the amount of flow restriction provided. In many embodiments, the maximum flow rate is between 50 gph and 100 gph at a supply pressure of 75 psi to 110 psi and the minimum flow rate is approximately 15 gph at a supply pressure of 80 psi to 100 psi.

In many embodiments, the main body of the adjustable bypass manifold further includes a cooling supply fluid outlet to output at least a portion of the first flow of the cooling fluid to be dispensed by a beverage dispensing assembly when the cooling fluid is a beverage fluid. The cooling fluid supply outlet can be integrated into the adjustable bypass manifold in any suitable way. For example, the cooling fluid supply outlet can be integrated into the adjustable bypass manifold so that the cooling fluid supply outlet is in fluid communication with the cooling fluid supply duct and the cooling fluid supply outlet is in fluid communication with the cooling fluid return duct through the adjustable flow restriction. As another example, the cooling fluid supply outlet can be integrated into the adjustable bypass manifold so that the cooling fluid supply outlet is in fluid communication with the cooling fluid return duct and the cooling fluid supply outlet is in fluid communication with the cooling fluid supply duct through the adjustable flow restriction.

In another aspect, a beverage dispensing apparatus is provided. The beverage dispensing apparatus includes a dispensing assembly configured to dispense a beverage fluid, a dispensing valve and manifold assembly configured to control dispensing of the beverage fluid from the dispensing assembly, a recirculation loop extending downstream of the dispensing valve and manifold assembly and configured to maintain the beverage fluid at a temperature below ambient temperature by a predetermined amount, and a dynamic flow regulator configured to maintain a substantially constant flow rate of the cooling fluid through the recirculation loop over a range of supply pressures of the cooling fluid. In many embodiments, the range of supply pressures is 75 psi to 110 psi. And in many embodiments, the substantially constant flow rate of cooling fluid is approximately 5 ml per second.

For a fuller understanding of the nature and advantages of the present invention, reference should be made to the ensuing detailed description and accompanying drawings.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Adjustable Bypass Manifold

Figure 1:
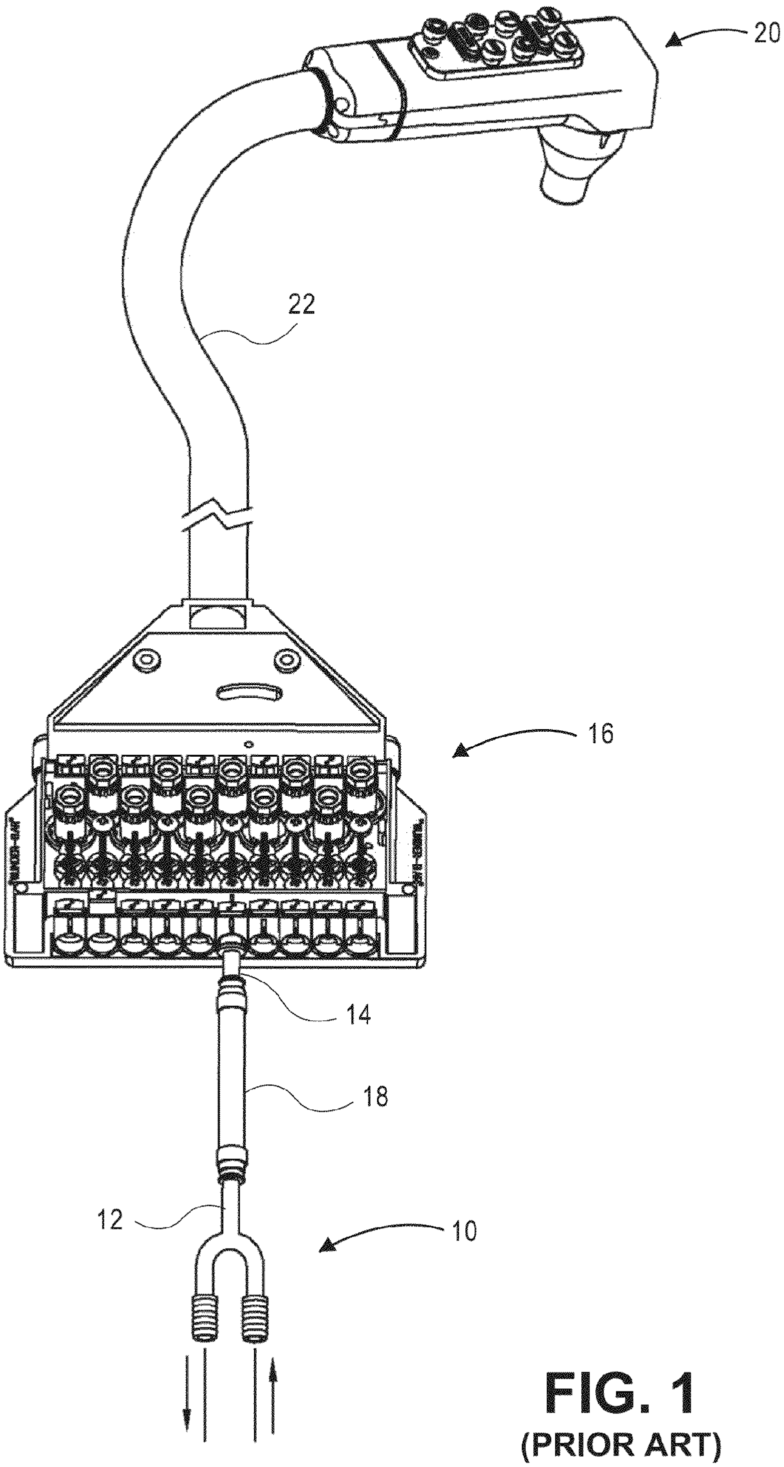
FIG. 1 (PRIOR ART)
FIG. 1 is a perspective view illustrating an existing beverage dispensing apparatus that includes a recirculation loop located upstream of a dispensing valve and manifold assembly.
Figure 2:
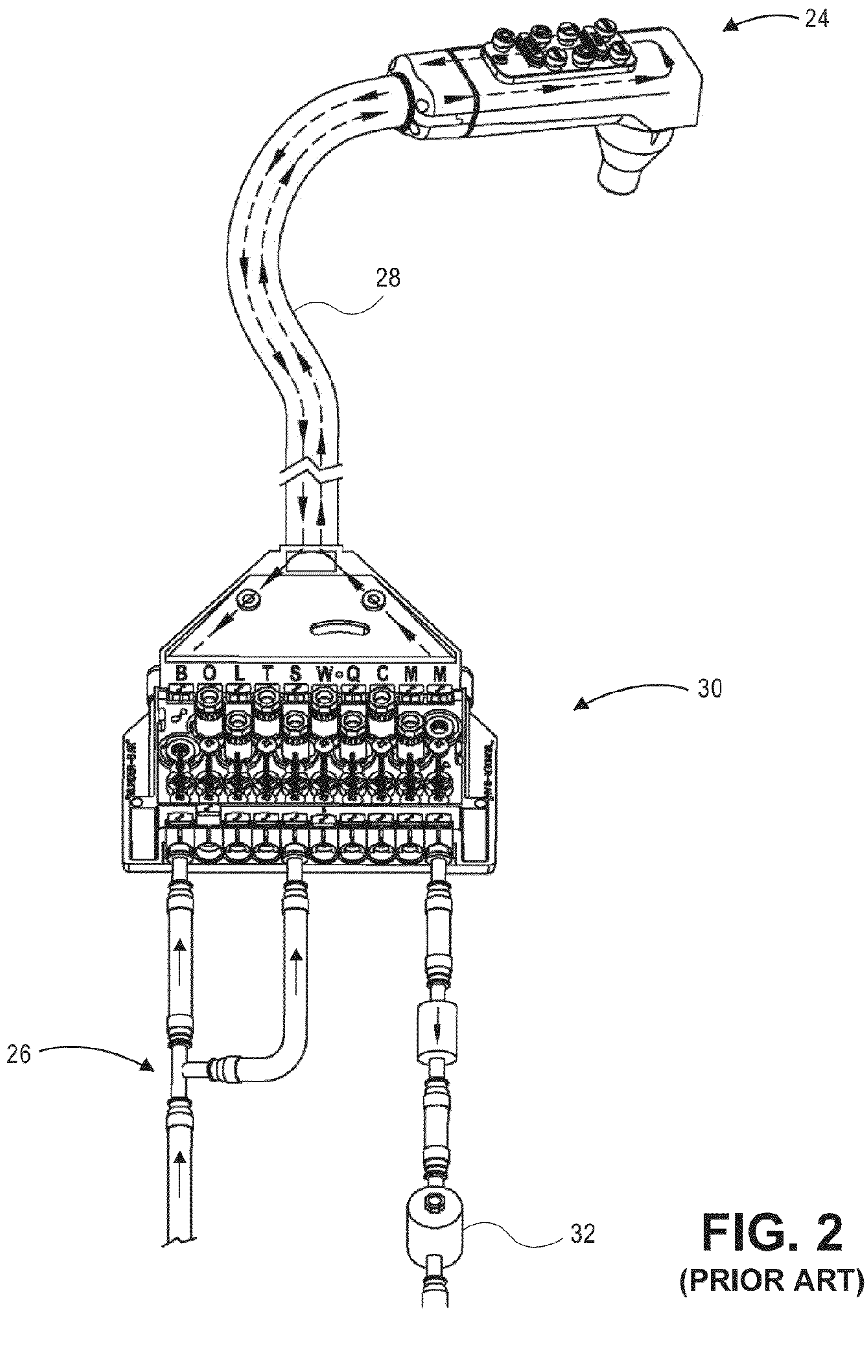
FIG. 2 (PRIOR ART)
FIG. 2 is a perspective view illustrating an existing beverage dispensing system apparatus that includes a recirculation loop that extends to a dispensing bar gun.
Figure 3A:
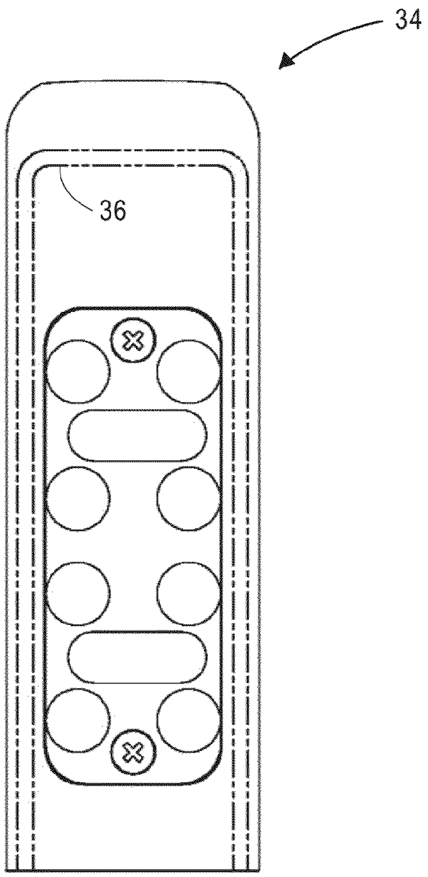
FIG. 3A (PRIOR ART)
FIGS. 3A and 3B illustrate an existing dispensing bar gun that includes a recirculation loop that is machined into a layer of the bar gun.
Figure 3B:
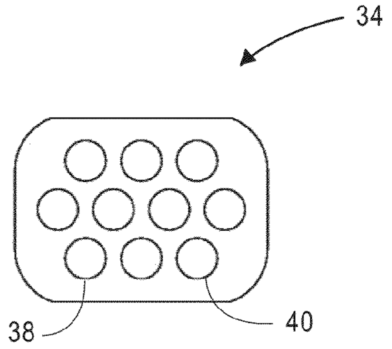
FIG. 3B (PRIOR ART)
Figure 4A:
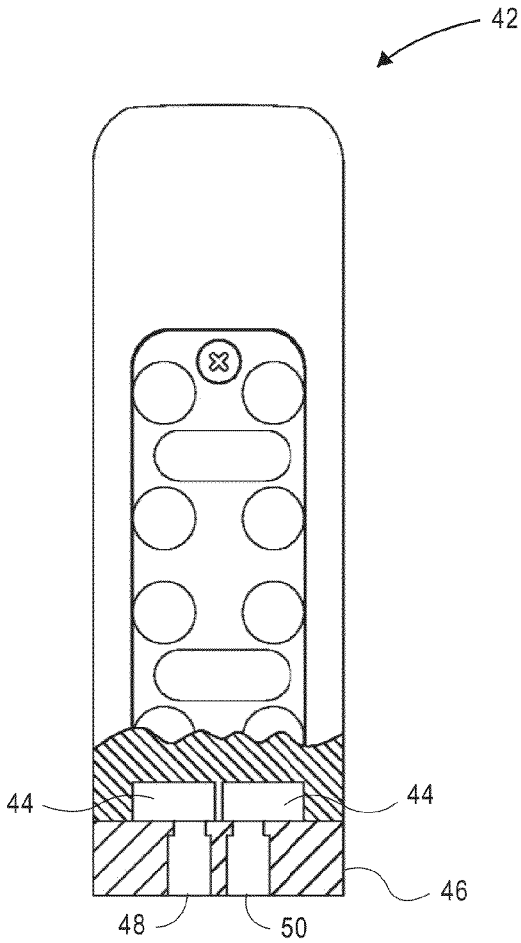
FIG. 4A (PRIOR ART)
FIGS. 4A, 4B, and 4C illustrate an existing dispensing bar gun that includes a recirculation loop that is molded into a handle member of the bar gun.
Figure 4B:
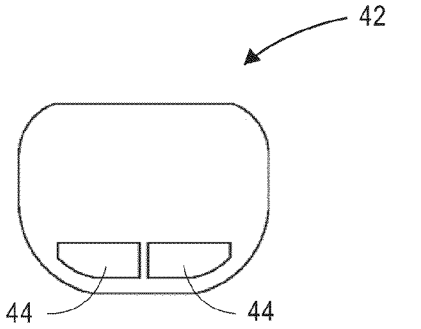
FIG. 4B (PRIOR ART)
Figure 4C:
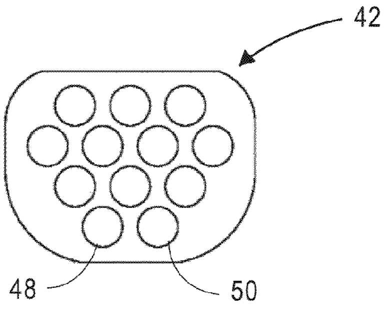
FIG. 4C (PRIOR ART)
Figure 5:
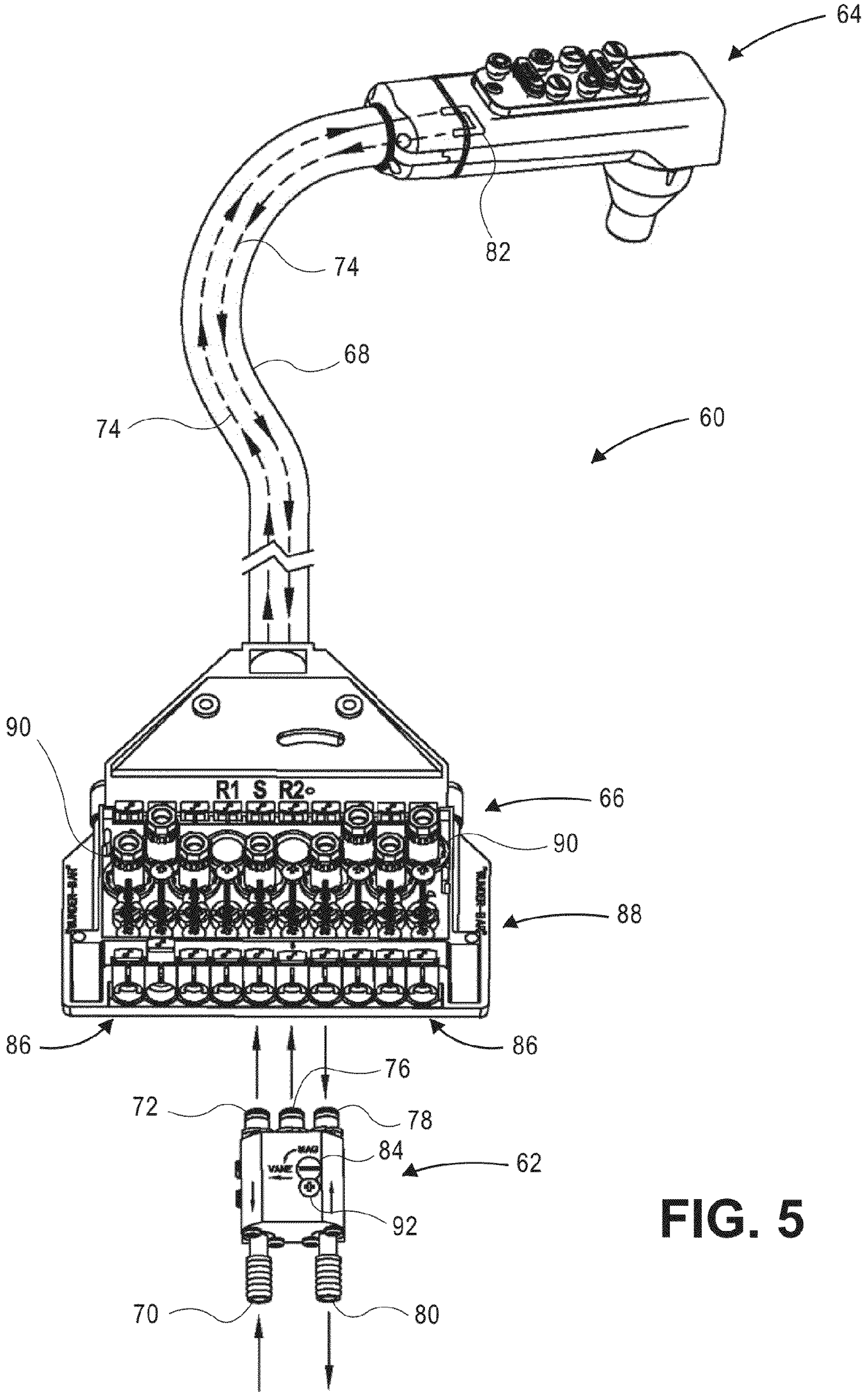
FIG. 5 is a perspective view illustrating a beverage dispensing apparatus that includes an adjustable bypass manifold, in accordance with many embodiments.

Referring now to the drawings, in which like reference numerals represent like parts throughout the several views, FIG. 5 shows a beverage dispensing apparatus 60 that includes an adjustable bypass manifold 62, in accordance with many embodiments. The beverage dispensing apparatus 60 further includes a dispenser (e.g., bar gun 64), a dispensing valve and manifold assembly 66, and a dispensing tube bundle 68.

The adjustable bypass manifold 62 includes inlets and outlets for the receipt and discharge of flows of a cooling fluid. These inlets and outlets include a cooling fluid supply inlet 70 that receives a flow of the cooling fluid, a recirculation loop supply outlet 72 that discharges a flow of the cooling fluid to a recirculation loop 74 that extends to the bar gun 64, a cooling fluid supply outlet 76 that discharges a flow of the cooling fluid through the dispensing valve and manifold assembly 66 to the bar gun 64 for dispensing from the bar gun 64, a cooling fluid return inlet 78 receiving returning cooling fluid from the recirculation loop 74, and a cooling fluid return outlet 80 that discharges cooling fluid that is subsequently re-circulated through, for example, additional dispensing subassemblies and/or back through the cooling fluid source employed (e.g., a refrigerated re-circulating carbonator, a cooling plate system).

In many embodiments, the recirculation loop 74 serves to cool beverage fluids in the dispensing tube bundle 68 by absorbing heat into the cooling fluid being circulated through the recirculation loop 74. The dispensing tube bundle 68 includes a plurality of fluid lines, two of which are used to form part of the recirculation loop 74. The bar gun 64 includes a recirculation loop portion 82 that completes the recirculation loop 74. The dispensing tube bundle 68 can include an exterior sheath with some heat insulating capability to inhibit heat transfer from the surrounding ambient environment into the beverage fluids in the fluid lines, thereby further serving to help maintain the beverage fluids in the fluid lines in a chilled state.

The adjustable bypass manifold 62 includes an adjustable restriction member 84 that can be positioned to vary bypass flow characteristics of the bypass manifold 62. In operation, a portion of the flow of cooling fluid received into the bypass manifold 62 via the cooling fluid supply inlet 70 is transferred directly through the adjustable restriction member 84 to be directly discharged from the cooling fluid return outlet 80. By adjusting a setting of the adjustable restriction member 84, different flow rates and supply pressures of the cooling fluid corresponding to particular sources of cooling fluid (e.g., a Vane Pump system operating at 50 to 100 gph at a supply pressure of 75 psi to 110 psi, a Mag Pump system operating at 5 to 10 gph at a supply pressure of 50 psi to 75 psi) can be accommodated. For example, with a Vane Pump system that is circulating 50 to 100 gph of chilled soda at a supply pressure of 75 psi to 110 psi, the adjustable restriction member 84 can be adjusted to a setting that provides an amount of restriction suitable to bypass a large portion of the 50 to 100 gph and routes a suitable flow rate of the cooling fluid (e.g., 5 ml per second) through the recirculation loop 74. With a Mag Pump system that is circulating 5 to 10 gph of chilled soda at a supply pressure of 50 to 75 psi, the adjustable restriction member 84 can be adjusted to a setting that provides an amount of restriction (increased restriction for the Mag Pump system as compared to the restriction for the Vane Pump system) suitable to route a suitable flow rate of the cooling fluid (e.g., 5 ml per second) through the recirculation loop 74, while bypassing the rest of the flow rate to be discharged directly from the cooling fluid return outlet 80 without being circulated through the recirculation loop 74.

The dispensing valve and manifold assembly 66 controls the transfer of beverage fluids to the bar gun 64. The valve and manifold assembly 66 includes a row of fluid input ports 86, a corresponding row of flow control valves 88, and a corresponding row of flow controls 90. Each of the input ports 86 is in fluid communication with a corresponding output port of the manifold assembly 66 through a corresponding one of the flow control valves 88 and one of the corresponding flow controls 90, thereby providing a corresponding plurality of fluid flow channels through the valve and manifold assembly that individually control what rate a fluid flows through the individual flow channel when the corresponding valve in the handle 64 is opened. And each of the flow control valves 88 can be configured to control the flow of a fluid through the associated flow channel, for example, to prevent flow beyond the flow control valve during periods of disassembly and/or servicing. Any suitable flow restriction can be used, for example, fixed flow restrictions can be used, and adjustable flow restrictions can be used.

In the beverage dispensing apparatus 60, two of the flow channels of the dispensing valve and manifold assembly 66 form part of the recirculation loop 74 that extends from the adjustable bypass manifold 62 to the bar gun 64. One of the flow channels receives a flow of the cooling fluid from the recirculation loop supply outlet 72 and transfers the fluid to a fluid line in the dispensing tube bundle 68 that forms part of the recirculation loop 74. And another one of the flow channels returns the re-circulating cooling fluid from a return fluid line in the dispensing tube bundle 68 that forms part of the recirculation loop 74, and transfers the returned cooling fluid to the cooling fluid return inlet 78 of the adjustable bypass manifold 62. The associated flow controls in the dispensing valve and manifold assembly 66 can be configured to control the flow rate at which the cooling fluid is circulated through the recirculation loop 74. Accordingly, the amount of cooling provided by the recirculation loop 74 can be controlled to provide a suitable amount of cooling without providing excessive cooling that may result in the formation of significant amounts of condensation.

Figure 6:
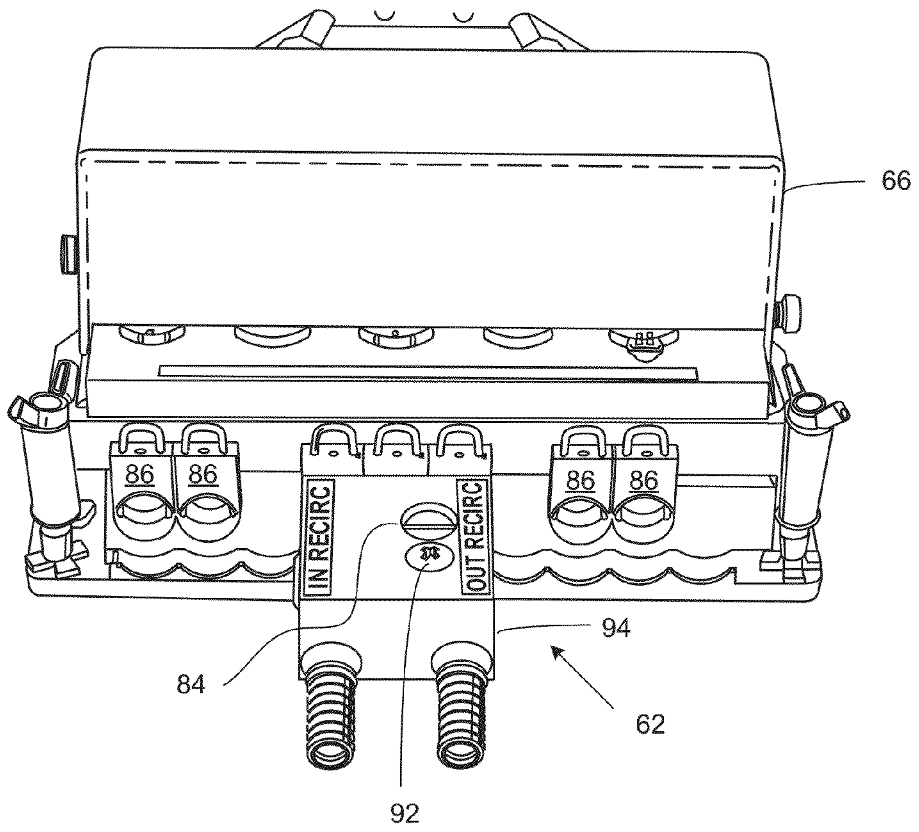
FIG. 6 is a perspective view illustrating an adjustable bypass manifold coupled to a dispensing valve and manifold assembly of a beverage dispensing apparatus, in accordance with many embodiments.

FIG. 6 shows the adjustable bypass manifold 62 coupled directly to the dispensing valve and manifold assembly 66. The row of fluid input ports 86 is configured to receive and couple with complementary shaped and spaced male fittings of the adjustable bypass manifold 62 corresponding to the recirculation supply outlet 72, the cooling fluid supply outlet 76, and the cooling fluid return inlet 78 (shown in FIG. 5). The valve and manifold assembly 66 includes retainer clips that are used to secure a male fitting with a corresponding fluid input port 86.

The adjustable restriction member 84 is rotatable between a "Vane" position that provides a relatively small amount of restriction to fluid flow suitable for the relatively large flow rates of a Vane Pump system and a "Mag" Position that provides a relatively large amount of restriction to fluid flow suitable for the relatively small flow rates of a Mag Pump system. A locking screw 92 can be tightened onto the adjustable restriction member 84, thereby inhibiting relative rotation between the restriction member 84 and a welded main body 94 of the adjustable bypass manifold 62.

Figure 7A:
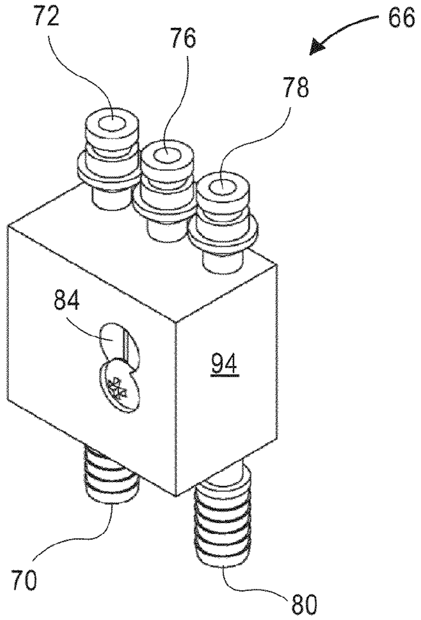
FIGS. 7A through 7D illustrate a welded adjustable bypass manifold that includes an adjustable restriction member, the adjustable restriction member being in a closed position, in accordance with many embodiments.
Figure 7B:
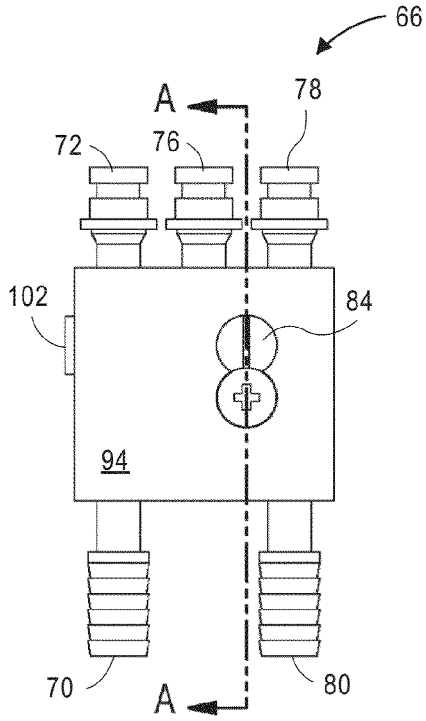
Figure 7C:
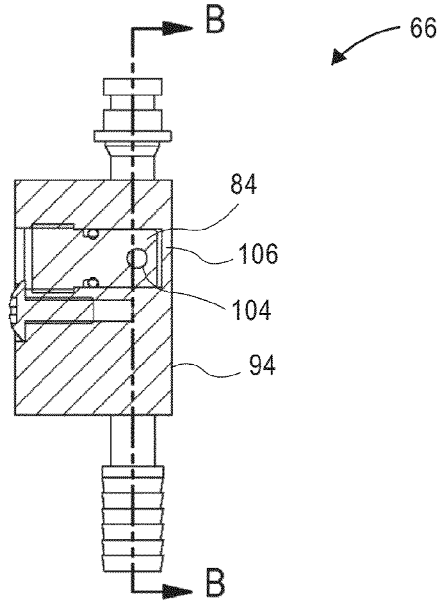
Figure 7D:
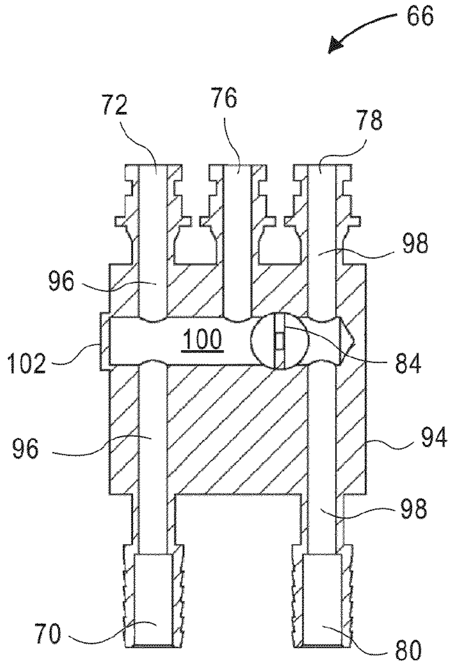

FIGS. 7A through 7D show various views of the adjustable bypass manifold 66 with the adjustable restriction member 84 in the closed position (e.g., Mag Position). FIG. 7A shows a perspective view of the bypass manifold 66. FIG. 7B shows a plan view of the bypass manifold 66. FIG. 7C shows cross-sectional view AA as defined by FIG. 7B. And FIG. 7D shows cross-sectional view BB as defined by FIG. 7C.

The bypass manifold 66 includes the welded main body 94, the adjustable restriction member 84, and the locking screw 92. The welded main body 94 includes the three male couplings (corresponding to the recirculation supply outlet 72, the cooling fluid supply outlet 76, and the cooling fluid return inlet 78), which are shaped to couple with three adjacent fluid input ports 86 of the valve and manifold assembly 66. The welded main body 94 further includes two male couplings (corresponding to the cooling supply inlet 70 and the cooling fluid return outlet 80), each of which includes directionally-biased serrated "barbs" configured to interface with a mating supply tubing to inhibit disengagement of the mating supply tubing from the male coupling.

As shown in FIG. 7D, the welded main body 94 forms a cooling fluid supply duct 96, a cooling fluid return duct 98, and a transverse duct 100 connecting the supply duct 96 with the return duct 98. Each of the cooling fluid supply inlet 70 and the recirculation supply outlet 72 is in fluid communication with the supply duct 96. Each of the cooling fluid return inlet 78 and the cooling fluid return outlet 80 is in fluid communication with the return duct 98. And the cooling fluid supply outlet 76 is in fluid communication with the supply duct 96 through the cross duct 100. The adjustable restriction member 84 intersects the cross duct 100 such that the return duct 98 is in fluid communication with the supply duct 96 through the adjustable restriction member 84. A capping member 102 is used to close the end of the cross duct 100 after the cross duct 100 has been formed.

The adjustable restriction member 84 includes an orifice 104 in an end portion of the restriction member 84. The orifice 104 is sized to provide for a controlled amount of minimum bypass flow rate of cooling fluid from the supply duct 96 to the return duct 98 when the adjustable restriction member 84 is in the closed position (i.e., the "Mag Position") as shown in FIGS. 7A through 7D. While a circular orifice 104 is shown, the restriction member 84 can be configured in any other suitable way to provide for a controlled amount of minimum bypass flow rate suitable to the recirculation system used (e.g., a Mag Pump system). And as shown in FIG. 7C, a gap 106 between the restriction member 84 and the main body 94 provides an additional path for bypass of cooling fluid beyond that provided by the orifice 104. In many embodiments, the restriction member 84 includes external threads that engage an internally threaded hole in the main body 94. Different sizes of the gap 106 can be achieved by rotating the restriction member 84 by 180 degree increments relative to the main body, thereby adjusting the gap while still having the restriction member in the closed position as shown in FIGS. 7A through 7D. The different gap sizes can be used to adjust the minimum bypass flow rate.

Figure 8A:
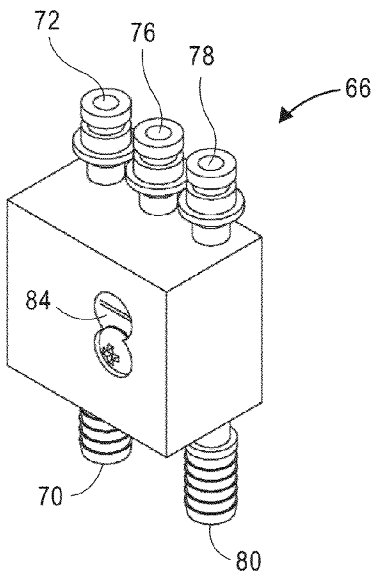
FIGS. 8A through 8D illustrate the welded adjustable bypass manifold of FIG. 7A with the adjustable restriction member in an open position, in accordance with many embodiments.
Figure 8B:
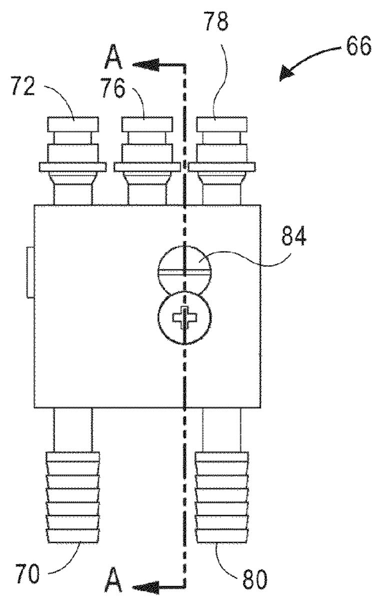
Figure 8C:
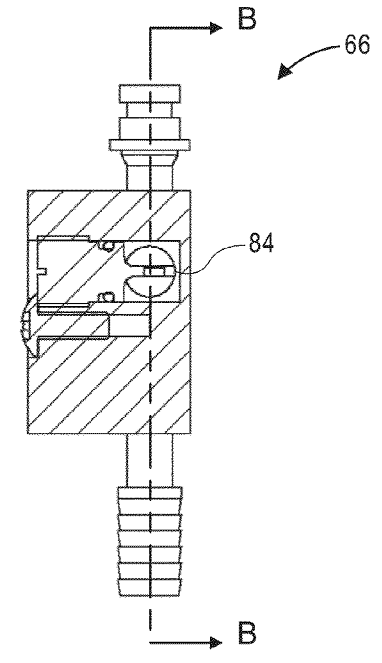
Figure 8D:
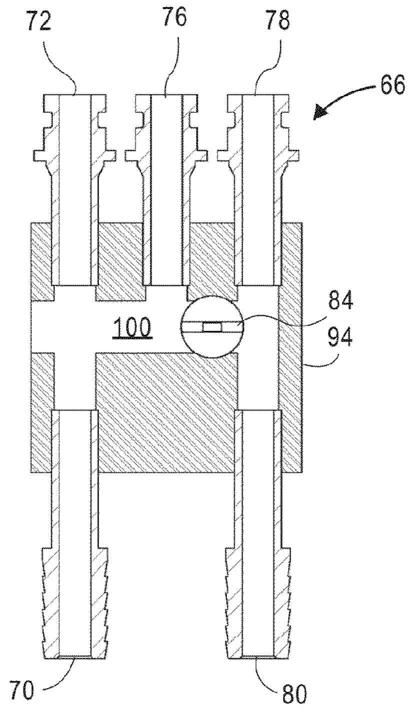

FIGS. 8A through 8D show various views of the adjustable bypass manifold 66 with the adjustable restriction member 84 in the open position (i.e., Vane Position). FIG. 8A shows a perspective view of the bypass manifold 66. FIG. 8B shows a plan view of the bypass manifold 66. FIG. 8C shows cross-sectional view AA as defined by FIG. 8B. And FIG. 8D shows cross-sectional view BB as defined by FIG. 8C.

As shown in FIG. 8D, the three male couplings (corresponding to the recirculation supply outlet 72, the cooling fluid supply outlet 76, and the cooling fluid return inlet 78) can be separate elements that are then coupled to the body member 94, for example, by press-fitting, welding, brazing, or other suitable approach. Likewise, the two male couplings (corresponding to the cooling supply inlet 70 and the cooling fluid return outlet 80) can be separate members that are coupled to the body member 94.

In the open position, the end portion of the restriction member 84 is oriented in alignment with the cross duct 100. In the open position, the blockage of the cross duct 100 by the restriction member 84 is minimized so as to maximize the resulting amount of bypass flow.

Figure 9A:
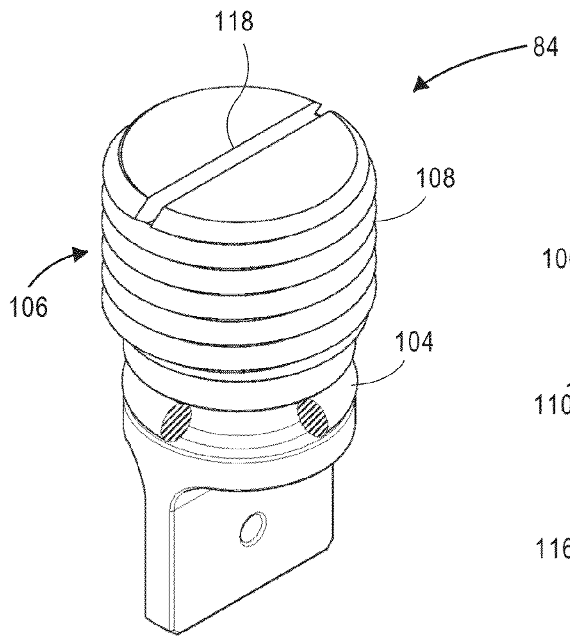
FIGS. 9A through 9C illustrate a restriction member of an adjustable bypass manifold, in accordance with many embodiments.
Figure 9B:
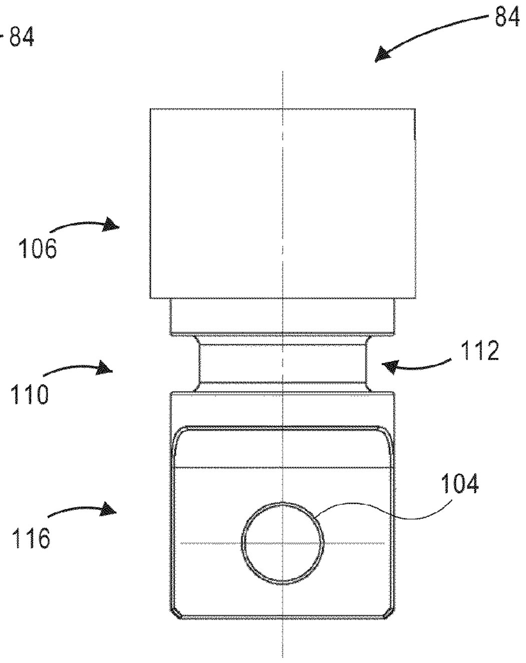
Figure 9C:
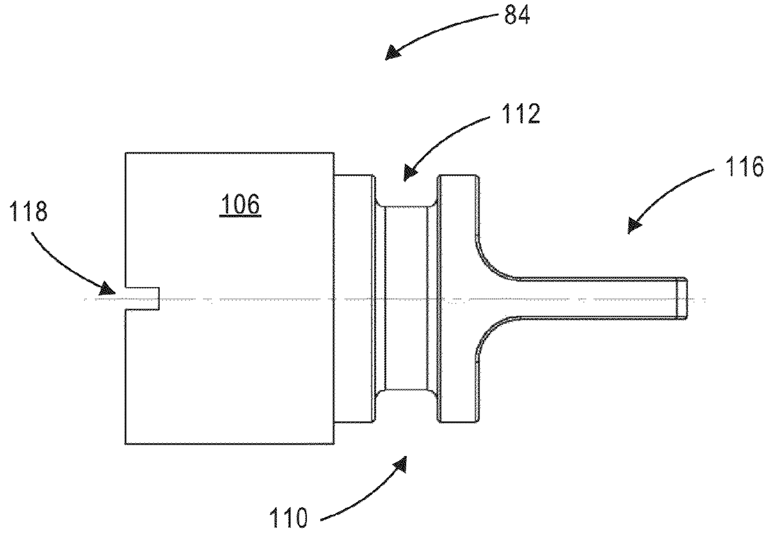

FIGS. 9A through 9C show various views of the adjustable restriction member 84. FIG. 9A shows a perspective view of the restriction member 84. FIG. 9B shows a side view of the restriction member 84 illustrating the orifice 104 in the end portion of the restriction member 84. And FIG. 9C shows a side view of the restriction member 84 further illustrating the end portion of the restriction member 84.

The adjustable restriction member 84 includes a cylindrically-shaped top portion 106 having external threads 108, a center portion 110 having a seal recess 112 shaped to interface with and retain an o-ring seal 114, and the fin-shaped end portion 116 having the orifice 104. A slot 118 is located in a top surface of the top portion 106. In many embodiments, the top, center, and end portions 106, 110, 116 are formed as a monolithic part, for example, by molding, by machining, or by any other suitable known approach.

The adjustable restriction member 84 is installed into a receptacle in the main body 94. The receptacle is perpendicular to and intersects the cross duct 100. The receptacle has a cylindrical configuration. A top portion of the receptacle includes internal threads that interface with the external threads 108 of the restriction member 84. The o-ring seal 114 interfaces with a cylindrical inner surface of the receptacle, thereby sealing between the restriction member 84 and the main body 94.

Figure 10A:
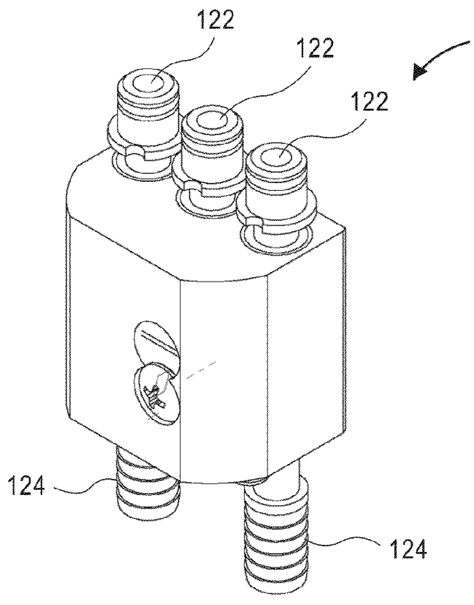
FIGS. 10A through 10F illustrate a built-up molded or machined plastic adjustable bypass manifold, in accordance with many embodiments.
Figure 10B:
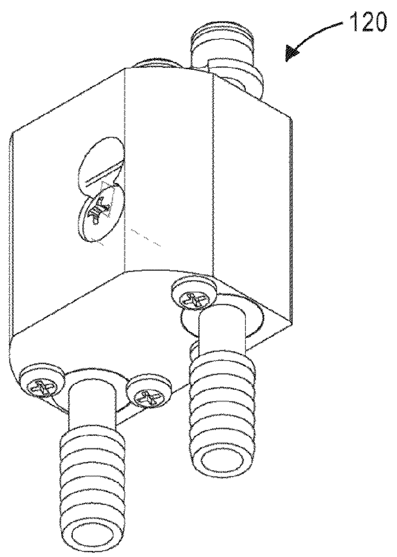
Figure 10C:
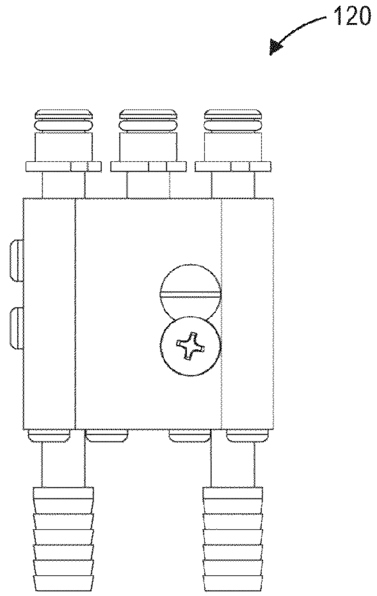
Figure 10D:
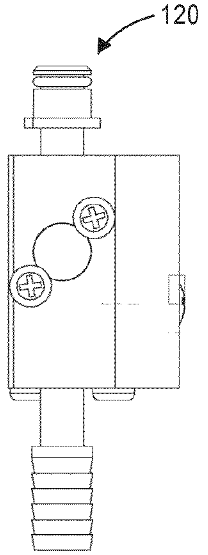
Figure 10E:
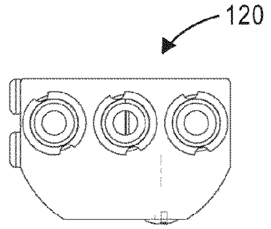
Figure 10F:
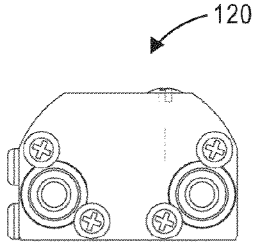
Figure 11:
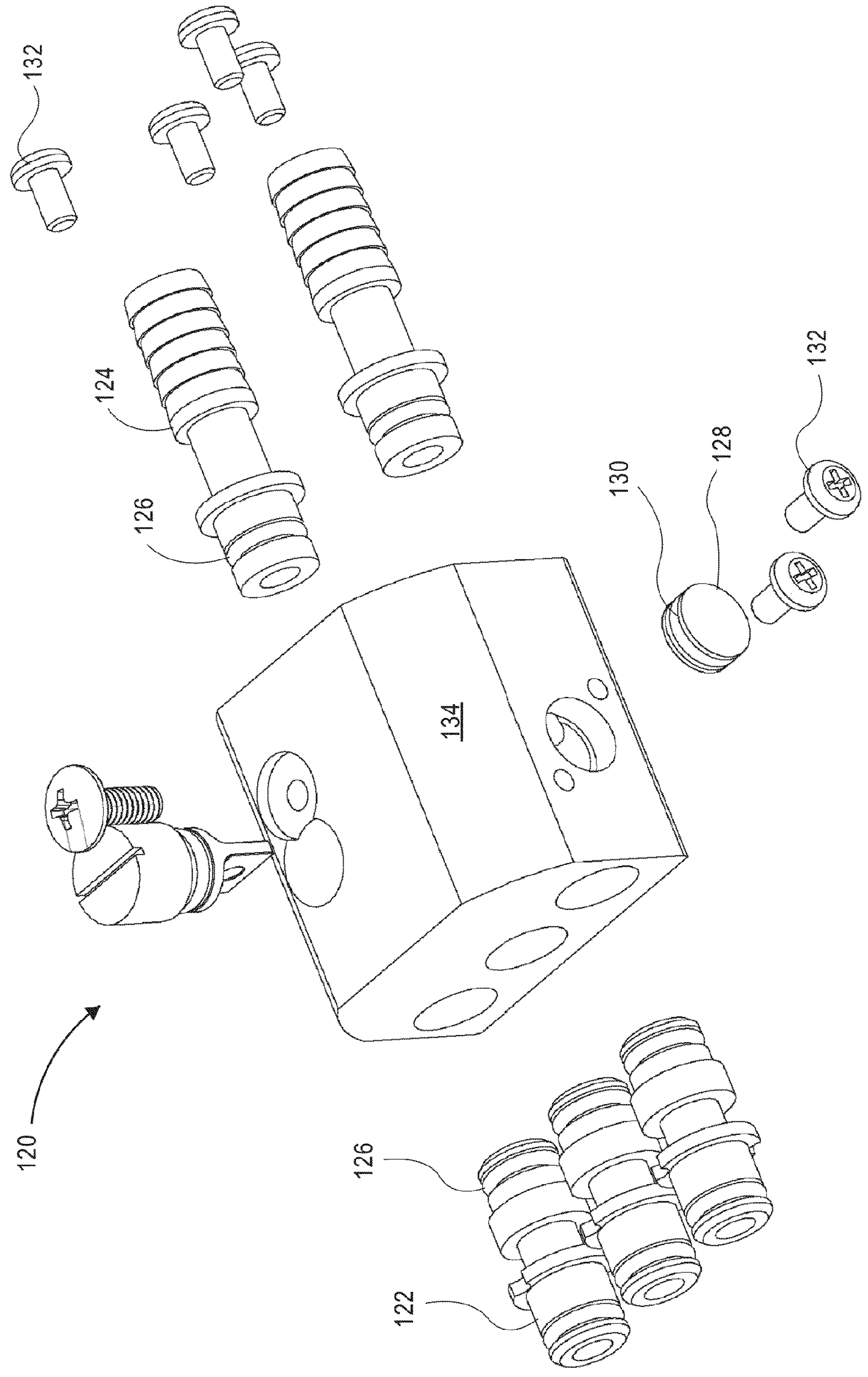
FIG. 11 is an exploded perspective view illustrating the built-up adjustable manifold of FIG. 10A.

FIG. 10A through FIG. 11 illustrates another adjustable bypass manifold 120, in accordance with many embodiments. The bypass manifold 120 is similar to the bypass manifold 66 described above, but includes coupling fittings 122, 124 having o-ring seals 126, a close-out cap 128 having an o-ring seal 130, and screws 132 to retain the coupling fittings 124 and the close-out cap 128 to a main body 134 of the bypass manifold 120. The coupling fittings 122 can be retained to the main body by a suitable method, for example, by press-fitting, by bonding, or any other suitable method such as the use of screws to retain the coupling fittings to the main body 134.

The beverage dispensing apparatus described herein can be aggregated to form a beverage dispensing system in which multiple beverage dispensers are serviced by a single cooling fluid source, such as chilled soda water from a vane pump driven refrigerated re-circulating carbonator. In such a system, each of the adjustable bypass manifolds is in fluid communication with a recirculation line carrying the cooling fluid and circulating the cooling fluid through a cooler.

Figure 12A:
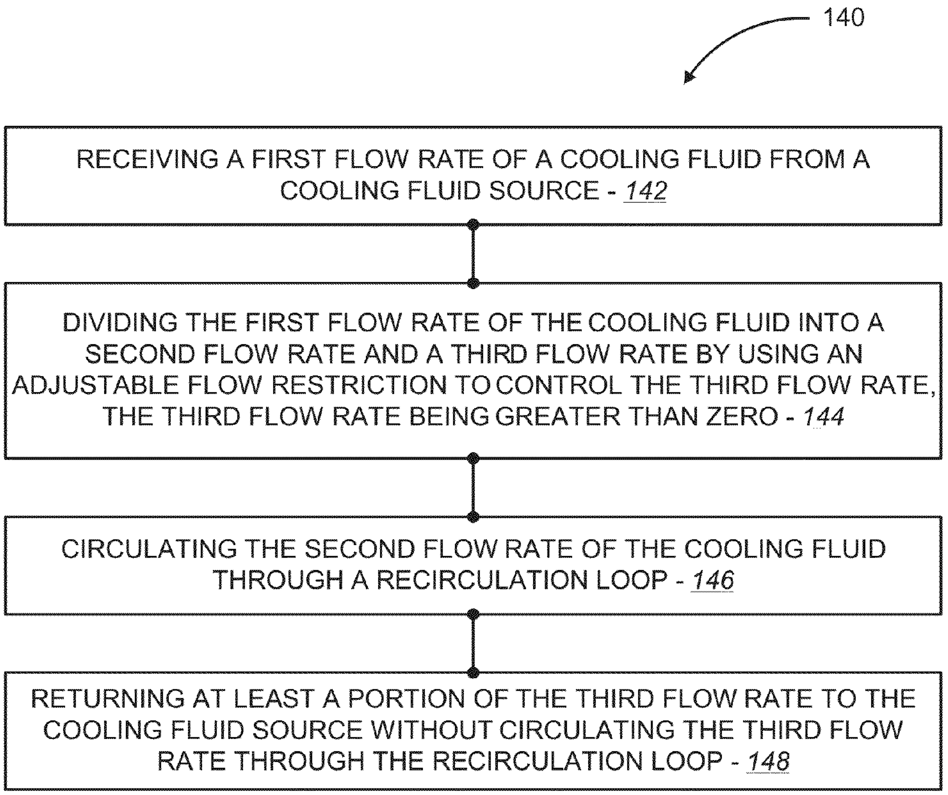
FIG. 12A is a simplified diagram listing acts of a method for cooling beverage fluids in supply lines conveying the beverage fluids to a dispensing assembly, in accordance with many embodiments.

FIG. 12A is a simplified diagram listing acts of a method 140 for cooling beverage fluids in supply lines conveying the beverage fluids to a dispensing assembly, in accordance with many embodiments. The beverage dispensing apparatus described herein can be used to practice the method 140. The method 140 includes receiving a first flow rate of a cooling fluid from a cooling fluid source (act 142). The first flow rate of the cooling fluid is divided into a second flow rate and a third flow rate by using an adjustable flow restriction to control the third flow rate, the third flow rate being greater than zero (act 144). The second flow rate of the cooling fluid is circulated through a recirculation loop (act 146). And at least a portion of the third flow rate is returned to the cooling fluid source without circulating the third flow rate through the recirculation loop (act 148).

Figure 12B:
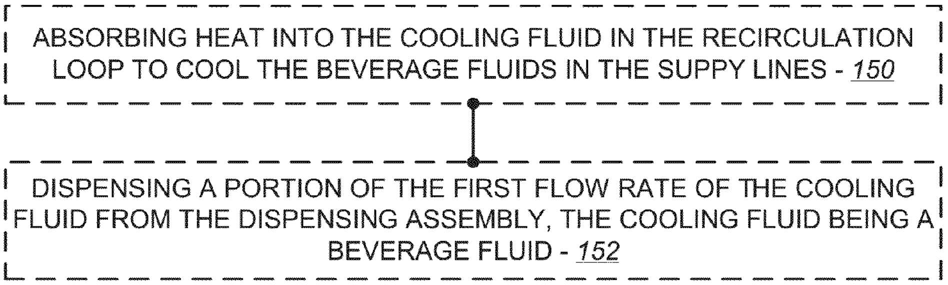
FIG. 12B is a simplified diagram listing optional acts that can be accomplished in the method of FIG. 12A, in accordance with many embodiments.

FIG. 12B is a simplified diagram listing optional acts that can be added to the method 140, in accordance with many embodiments. These optional acts include absorbing heat into the cooling fluid in the recirculation loop to cool the beverage fluids in the supply lines (act 150); and dispensing a portion of the first flow rate of the cooling fluid from the dispensing assembly, the cooling fluid being a beverage fluid (act 152).

Condensation Control

It was discovered that insulating the dispensing valve and manifold assembly 66 and the dispensing tube bundle 68 may not be sufficient in isolation to inhibit the formation of condensation to an extent desired. Refrigerated re-circulating carbonators typically produce and maintain soda at about 34° F. Although extensive research was conducted into insulation technology, it was discovered that the thickness of insulation required to insulate the dispensing tube bundle 68 to prevent condensation from forming on the dispensing tube bundle 68 would result in a dispensing tube bundle of excessive diameter and stiffness, which would make the dispensing tube bundle unwieldy for the end-user. Research was then conducted into methods for moderating the flow rate of the 34° F. soda through the recirculation loop 74. As a result of this research, two separate methods were identified that allow sufficient chilled soda to flow through the recirculation loop 74 to maintain soda, water, and syrup temperatures at a nominal 36° F., even in environments with humidity levels ranging all the way up to 90% and ambient surrounding air temperatures of up to 90° F.

Dynamic Flow Control

Figure 13:
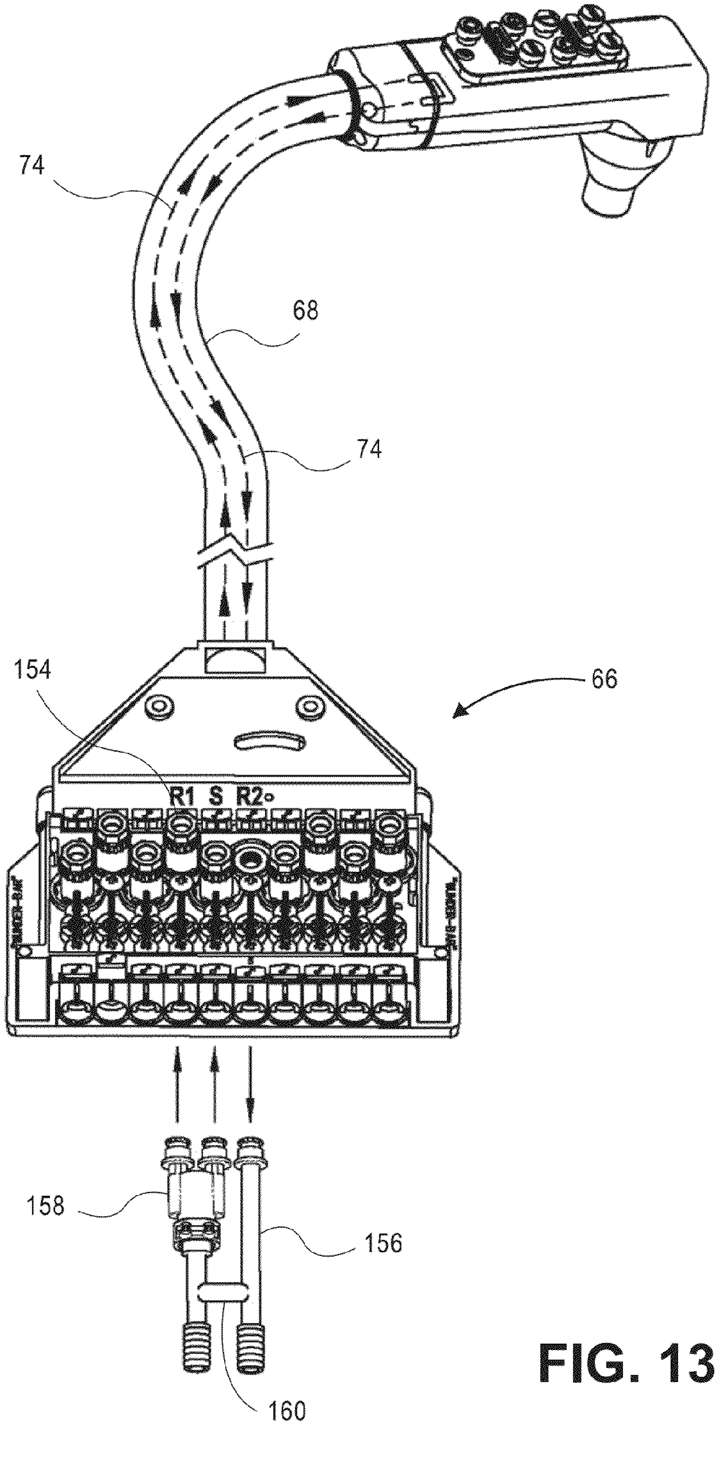
FIG. 13 is a perspective view of a beverage dispensing apparatus that employs a dynamic flow regulator to maintain a consistent flow rate of a re-circulated cooling fluid, in accordance with many embodiments.

Referring to FIG. 13, the first method involves the use of a dynamic flow regulator 154 preset to maintain a consistent soda flow rate through the recirculation loop 74 of a magnitude suitable to provide sufficient cooling while also sufficiently inhibiting the formation of condensation (e.g., 5 ml per second). The dynamic flow regulator 154 is positioned in the valve and manifold assembly 66 at the inlet of the chilled soda and is then adjusted to desired flow rate (e.g., 5 ml per second). The dynamic flow regulator 154 is used is to actively compensate for variations in soda flow rates, especially when the dispenser is installed on a multiple dispenser system. The dispensing apparatus configuration shown in FIG. 13 can be used with soda recirculation systems that use a refrigerated Vane pump carbonator. When used with such a Vane Pump carbonator, a simpler, less expensive "H" by-pass fitting assembly 156 can also be employed, along with a "Wunder-Bar Dual Water Input Fitting" 158, which is employed to spit the incoming soda off to the soda recirculation loop 74 and to an inlet for soda to be used for beverages. The "H" by-pass fitting assembly 156 includes a cross duct 160. In many embodiments, the cross duct 160 is configured to generate a sufficient pressure drop necessary to generate a desired flow rate of chilled water through the recirculation loop 74, while still providing a desired by-pass flow rate.

Flow Restrictor

Figure 14:
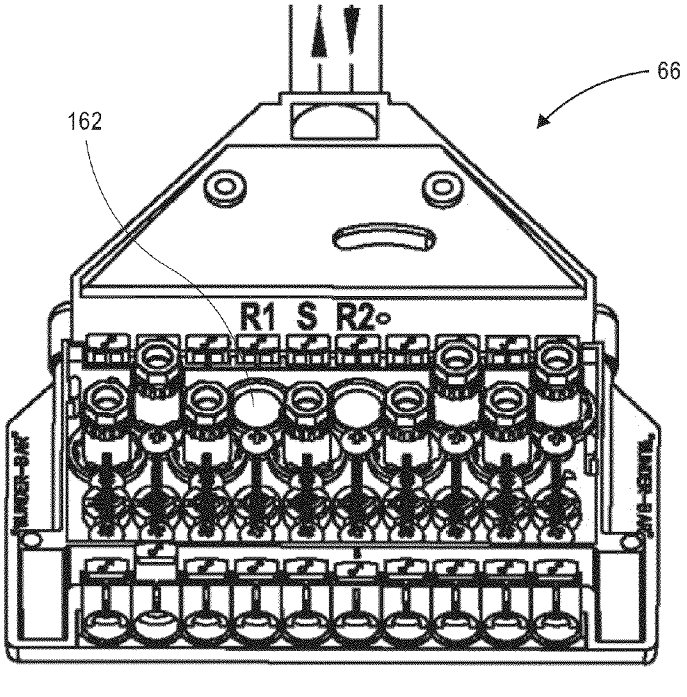
FIG. 14 is a perspective view of a valve and manifold assembly having a flow restrictor to maintain a consistent flow rate of a re-circulated cooling fluid, in accordance with many embodiments.

Referring to FIG. 14, the second method involves the use of a flow restrictor 162 in the valve and manifold assembly 66 to restrict the flow rate of the chilled soda through the recirculation loop to a consistent flow rate selected to provide sufficient cooling while also limited to sufficiently inhibit the formation of condensation (e.g., 5 ml per second). The second method can be used with beverage dispensers equipped with the adjustable bypass manifold 62. For beverage dispensers equipped with the adjustable bypass manifold 62, it may not be possible to use a dynamic flow regulator due to the reduced pressure generated in Magnetic Pump driven recirculation systems. In many embodiments, the flow restrictor 162 is configured as an insert fitting having an orifice configured to restrict the flow rate of the chilled soda through the recirculation loop to the desired consistent flow rate (e.g., 5 ml per second).

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A beverage dispensing apparatus comprising:

a dispensing assembly configured to dispense a beverage fluid;

a beverage supply line configured to supply the beverage fluid to the dispensing assembly;

an adjustable bypass manifold, comprising:

a cooling fluid supply inlet configured to receive a first flow of a cooling fluid, a cooling fluid supply duct in fluid communication with the cooling fluid supply inlet, a recirculation loop supply outlet in fluid communication with the cooling fluid supply duct, a recirculation loop return inlet, a cooling fluid return duct in fluid communication with the recirculation loop return inlet, a cooling fluid return outlet in fluid communication with the cooling fluid return duct, the cooling fluid return outlet configured to output at least a portion of the first flow of the cooling fluid, a bypass conduit directly fluidly connecting the cooling fluid supply duct to the cooling fluid return duct, and a flow restrictor disposed in the bypass conduit, wherein the flow restrictor is adjustable between an open position and a closed position to control a rate of flow of the cooling fluid through the flow restrictor, wherein, in the open position the flow restrictor defines a first passageway through the bypass conduit, the first passageway having a first cross-sectional area, wherein, in the closed position, the flow restrictor defines a second passageway through the bypass conduit, the second passageway having a second cross-sectional area smaller than the first cross-sectional area; and a recirculation loop in fluid communication with the recirculation loop supply outlet and the recirculation loop return inlet.

2. The beverage dispensing apparatus of claim 1, wherein the recirculation loop is configured to absorb heat so as to cool the beverage fluid in the supply line.

3. The beverage dispensing apparatus of claim 1, wherein the dispensing assembly is configured to selectively dispense a portion of the cooling fluid directly from the recirculation loop.

4. The beverage dispensing apparatus of claim 1, further comprising one or more additional beverage supply lines to supply one or more beverage fluids to the dispensing assembly, and wherein the recirculation loop is configured to absorb heat so as to cool the one or more beverage fluids in the beverage supply lines.

5. The beverage dispensing apparatus of claim 4, further comprising a valve assembly that includes a plurality of valves to selectively control the flow of the beverage fluids to the dispensing assembly.

6. The beverage dispensing apparatus of claim 5, wherein recirculation loop is in fluid communication with the adjustable bypass manifold through the valve assembly, the valve assembly being configured to control a rate of flow of the cooling fluid through the recirculation loop.

7. The beverage dispensing apparatus of claim 6, wherein the flow rate of the cooling fluid through the recirculation loop is controlled to inhibit the formation of condensation.

8. The beverage dispensing apparatus of claim 6, wherein the flow rate of the cooling fluid through the recirculation loop is approximately 5 ml per second.

9. The beverage dispensing apparatus of claim 6, wherein the valve assembly includes a dynamic flow regulator to maintain a substantially constant flow rate of the cooling fluid through the recirculation loop.

10. The beverage dispensing apparatus of claim 6, wherein the valve assembly includes a flow control device configured to maintain a substantially constant flow rate of the cooling fluid through the recirculation loop.

11. The beverage dispensing apparatus of claim 1, wherein a portion of the recirculation loop is disposed within the dispensing assembly.

12. The beverage dispensing apparatus of claim 1, wherein the adjustable bypass manifold is configured to accommodate the first flow of cooling fluid received by the cooling supply inlet of between 50 gallons per hour (gph) and 100 gph when the adjustable flow restrictor is in the open position and to accommodate the first flow of cooling fluid received by the cooling supply inlet of 15 gph when the adjustable flow restrictor is in the closed position.

13. The beverage dispensing apparatus of claim 1, wherein the flow restrictor is continuously adjustable between the open and closed positions to provide a corresponding continuous variation in the rate of flow of the cooling fluid.

14. The beverage dispensing apparatus of claim 1, wherein the adjustable bypass manifold further includes a cooling fluid supply outlet to output at least a portion of the first flow of the cooling fluid to a supply line that transfers the portion to the dispensing assembly for dispensing from the dispensing assembly, the cooling fluid being a beverage fluid.

15. The beverage dispensing apparatus of claim 14, wherein the cooling fluid supply outlet is in fluid communication with the cooling fluid supply duct and is in fluid communication with the cooling fluid return duct through the adjustable flow restrictor.

16. The beverage dispensing apparatus of claim 14, wherein the cooling fluid supply outlet is in fluid communication with the cooling fluid return duct and is in fluid communication with the cooling fluid supply duct through the adjustable flow restrictor.

17. The beverage dispensing apparatus of claim 14, wherein the cooling fluid is selected from the group consisting of water and carbonated water.

18. A beverage dispensing system comprising a plurality of beverage dispensing apparatus of claim 17, each of the adjustable bypass manifolds in fluid communication with a recirculation line carrying the cooling fluid and circulating the cooling fluid through a cooler.

19. A method of installing a beverage dispensing apparatus into a beverage dispensing system, the system comprising a pump configured to supply a cooling fluid to the beverage dispensing apparatus, wherein the pump is selected from the group consisting of a high-pressure pump that supplies the cooling fluid at a first, high pressure, and a low-pressure pump that supplies the cooling fluid at a second, lower pressure, the system further comprising a dispensing assembly configured to dispense a beverage fluid, and a beverage supply line configured to supply the beverage fluid to the dispensing assembly, the method comprising:

attaching a cooling fluid supply inlet of an adjustable bypass manifold to receive a first flow of the cooling fluid from the pump, wherein the adjustable bypass manifold further comprises a cooling fluid supply duct in fluid communication with the cooling fluid supply inlet, a recirculation loop supply outlet in fluid communication with the cooling fluid supply duct, a recirculation loop return inlet, a cooling fluid return duct in fluid communication with the recirculation loop return inlet, a cooling fluid return outlet in fluid communication with the cooling fluid return duct, a bypass conduit directly fluidly connecting the cooling fluid supply duct to the cooling fluid return duct, and a flow restrictor disposed in the bypass conduit, wherein the flow restrictor is adjustable between an open position and a closed position to control a rate of flow of the cooling fluid through the flow restrictor, wherein, in the open position, the flow restrictor defines a first passageway through the bypass conduit, the first passageway having a first cross-sectional area, wherein, in the closed position, the flow restrictor defines a second passageway through the bypass conduit, the second passageway having a second cross-sectional area smaller than the first cross-sectional area, and a recirculation loop in fluid communication with the recirculation loop supply outlet and the recirculation loop return inlet;

attaching the cooling fluid return outlet to output at least a portion of the first flow of the cooling fluid;

when the pump is a high-pressure pump, setting the flow restrictor to the open position; and when the pump is a low-pressure pump, setting the flow restrictor to the closed position.

* * * * *